(12) United States Patent     (10) Patent No.:   US 12,620,648 B2

Lv       (45) Date of Patent:     May 5, 2026

(54) HIGH VOLTAGE BOX, BATTERY AND ELECTRIC DEVICE

(71) Applicant: CONTEMPORARY AMPEREX TECHNOLOGY CO., LIMITED, Ningde (CN)

(72) Inventor: Juanxia Lv, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 527 days.

(21) Appl. No.: 18/299,159

(22) Filed: Apr. 12, 2023

(65) Prior Publication Data

US 2023/0275282 A1     Aug. 31, 2023

Related U.S. Application Data

(63) Continuation of application No. PCT/CN2022/093966, filed on May 19, 2022.

(30) Foreign Application Priority Data

Nov. 22, 2021    (CN) .......................... 202122866340.0

(51) Int. Cl.
    *H01M 10/653*      (2014.01)
    *H01M 10/6554*     (2014.01)
             (Continued)

(52) U.S. Cl.
    CPC ..... *H01M 10/653* (2015.04); *H01M 10/6554* (2015.04); *H01M 10/6568* (2015.04);
             (Continued)

(58) Field of Classification Search
    CPC ...... B60K 1/00; B60K 1/04; B60K 2001/003; B60K 2001/0416; B60K 2001/0438; B60Y 2200/91; B60Y 2200/92; H01M 10/613; H01M 10/625; H01M 10/643; H01M 10/653; H01M 10/6554; H01M 10/6556; H01M 10/6568; H01M 10/658; H01M 10/667; H01M 50/209; H01M 50/224; H01M 50/249; H01M 50/503; H01M 50/574; Y02E 60/10
    See application file for complete search history.

(56) References Cited

U.S. PATENT DOCUMENTS

2009/0194324 A1    8/2009   Nakayama et al.

FOREIGN PATENT DOCUMENTS

CN     207637716 U     7/2018
CN     210129503 U     3/2020
             (Continued)

OTHER PUBLICATIONS

Machine translation CN211931142U (Year: 2020).*

(Continued)

*Primary Examiner* — Victoria H Lynch

(74) *Attorney, Agent, or Firm* — ANOVA LAW GROUP, PLLC

(57) ABSTRACT

A high voltage box includes a housing and a relay. The housing includes an upper housing and a lower housing connected to each other to form an accommodating space. The relay is provided in the accommodating space and includes a conducting strip in contact with the lower housing.

18 Claims, 5 Drawing Sheets

(51) Int. Cl.
  *H01M 10/6568* (2014.01)
  *H01M 10/658* (2014.01)
  *H01M 50/224* (2021.01)
  *H01M 50/503* (2021.01)
(52) U.S. Cl.
  CPC ....... *H01M 10/658* (2015.04); *H01M 50/224* (2021.01); *H01M 50/503* (2021.01)

(56) References Cited

FOREIGN PATENT DOCUMENTS

| | | | |
|---|---|---|---|
| CN | 111354602 | A | 6/2020 |
| CN | 210926231 | U | 7/2020 |
| CN | 211931142 | U | 11/2020 |
| CN | 212587616 | U | 2/2021 |
| CN | 214013023 | U | 8/2021 |
| CN | 216251008 | U | 4/2022 |
| JP | 2021180233 | A | 11/2021 |
| WO | 2018105610 | A1 | 6/2018 |
| WO | 2020144985 | A1 | 7/2020 |

OTHER PUBLICATIONS

Machine translation CN212587616U (Year: 2021).*
Machine translation CN214013023U (Year: 2021).*
The China National Intellectual Property Administration (CNIPA) Notice of Grant of Utility Model Patent Rights for Application No. 202122866340.0 Mar. 7, 2022 2 pages (including translation).
The World Intellectual Property Organization (WIPO) International Search Report and Written Opinion for PCT/CN2022/093966 Aug. 8, 2022 14 Pages (including translation).
The European Patent Office (EPO) The Extended European Search Report for 22754755.1, Sep. 22, 2023 37 Pages.
Japan Patent Office (JPO) Notice of Reasons for Refusal For JP Application No. 2022-551052 Jan. 9, 2024 9 Pages (Translation Included).
Korea Patent Office (KPO) Request for the Submission of an Opinion For KO Application No. 10-2022-7029386 Mar. 18, 2024 10 Pages (Translation Included).

* cited by examiner

5(51)

7(711)

72

7

712    74    73    721    75

76

5(51)

712

7121

7122

A

713

HIGH VOLTAGE BOX, BATTERY AND ELECTRIC DEVICE

CROSS-REFERENCE TO RELATED APPLICATIONS

The present application is a continuation of International Application No. PCT/CN2022/093966, filed on May 19, 2022, which claims priority to Chinese Patent Application No. 202122866340.0, entitled "High Voltage Box, Battery and Electric Device", filed on Nov. 22, 2021, the entire contents of both of which are incorporated herein by reference.

TECHNICAL FIELD

The present application relates to the field of electrochemical device technologies, and particularly to a high voltage box, a battery and an electric device.

BACKGROUND ART

In an electric device, such as an electric or hybrid vehicle, or the like, a high voltage box is a control unit for distributing energy of a power battery, and is configured to distribute a high voltage of the power battery. In a related art, the high voltage box usually has centralized design, and structural design is compact. In order to guarantee normal operation of the vehicle, the high voltage box is required to work in a vibration environment, a high and low temperature environment, a damp and hot environment, an environment with high power output, or the like. However, the existing high voltage box has a poor heat dissipation effect, such that the high voltage box has an overheating problem, or the like, thus influencing safety performances of the battery and the electric device.

SUMMARY

In view of the above-mentioned problems, an object of the embodiments of the present application is to provide a high voltage box, a battery and an electric device, so as to improve a heat dissipation effect of the high voltage box, thereby improving a safety performance of the battery. The specific technical solution is as follows:

An embodiment of a first aspect of the present application provides a high voltage box, including: a housing and a relay, the housing including an upper housing and a lower housing, and the upper housing and the lower housing being connected to form an accommodating space; the relay being provided in the accommodating space, the relay including a conducting strip, and the conducting strip being in contact with the lower housing.

In the technical solution of the embodiment of the present application, the high voltage box may be provided in a battery box, and the lower housing of the high voltage box is fixedly connected with the battery box. The relay is provided in the high voltage box, and the conducting strip of the relay is in direct contact with an inner side of the lower housing of the high voltage box. In a working process of the high voltage box, heat generated by work of the relay is transferred to the conducting strip of the relay, and since the conducting strip is in direct contact with the inner side of the lower housing, the heat in the conducting strip may be directly transferred into the lower housing and is rapidly transferred to the outside of the high voltage box via the lower housing, thus reducing a probability of transferring and storing the heat inside the high voltage box. The heat generated by the relay is rapidly dissipated via the conducting strip and the lower housing, such that a heat dissipation efficiency of the high voltage box may be improved, thereby reducing a probability of an overheating phenomenon, or the like, of the high voltage box, and improving the safety performance of the battery.

In some embodiments, the high voltage box further includes a water cooling plate, the water cooling plate is in contact with one side of the lower housing away from the relay, the water cooling plate includes at least one water cooling channel, and the water cooling plate further includes a water inlet and a water outlet which are communicated with the at least one water cooling channel. Thus, the water cooling plate may absorb the heat transferred to the lower housing by components and parts, such as the relay, or the like, which may further improve the heat dissipation effect of the high voltage box, thereby further improving the safety performance of the battery.

In some embodiments, the lower housing includes a metal portion and a plastic portion which are integrally molded by injection. Thus, the metal portion in the lower housing may more quickly absorb the heat generated by the components and parts, such as the relay, or the like, and transfer the heat away, thus further improving the heat dissipation effect of the high voltage box.

In some embodiments, one side of the metal portion away from the relay is exposed on a surface of the lower housing and is in contact with the water cooling plate. Thus, the heat generated in the high voltage box may be quickly guided out via the metal portion and absorbed by the water cooling plate being in contact with the metal portion, which increases a heat transfer speed, thus further improving the heat dissipation effect of the high voltage box.

In some embodiments, the high voltage box further includes at least one heat conduction metal block, the at least one heat conduction metal block is provided in the accommodating space, and the at least one heat conduction metal block is connected with the conducting strip and is in contact with the lower housing. The at least one heat conduction metal block is provided in the high voltage box to be connected with the conducting strip, such that part of heat energy emitted by the relay may be stored; the at least one heat conduction metal block further is in contact with the lower housing, such that the heat energy stored by the at least one heat conduction metal block and the heat energy transferred by the relay may be better transferred to the lower housing, thus improving the heat dissipation efficiency.

In some embodiments, the high voltage box further includes a heat conduction pad and a heat-conduction insulating film, the heat conduction pad is provided between the lower housing and the water cooling plate, and the heat-conduction insulating film is provided between the heat conduction pad and the water cooling plate. Thus, the heat conduction pad may quickly absorb the heat in the high voltage box and quickly transfer the heat to the water cooling plate, thus further improving the heat dissipation efficiency of the high voltage box; the heat-conduction insulating film may reduce a probability that a current in the high voltage box is transmitted to the water cooling plate, thus improving safety of the high voltage box.

In some embodiments, one side of the metal portion close to the relay includes at least one electric connection region, and the at least one electric connection region is exposed on the surface of the lower housing. The electric connection region is exposed and thus conveniently connected with the components and parts in the high voltage box, thereby improving an efficiency of assembly between the lower housing and the components and parts of the high voltage box.

In some embodiments, the electric connection region is of a convex structure. The convex structure facilitates the connection between the electric connection region on the lower housing and the components and parts in the high voltage box, thereby further improving the efficiency of assembly between the lower housing and the components and parts of the high voltage box.

In some embodiments, a chamfered structure is provided at an edge of at least one side of the electric connection region, and the chamfered structure is provided with an insulating layer. The chamfered structure may reduce a probability of residual glue on an electric connection surface, thereby reducing a probability that the connection of the lower housing and the components and parts is influenced by the residual glue on the electric connection surface. Furthermore, the chamfered structure may reduce requirements for manufacturing precision of the lower housing and a manufacturing mold of the lower housing, thus simplifying production process flow of the lower housing; the chamfered structure is provided with the insulating layer, thus reducing an influence of the manufacturing mold of the lower housing on the electric connection surface in a pressing process, and also reducing a probability of mold damage in the pressing process.

An embodiment of a second aspect of the present application provides a battery, including the high voltage box according to any one of the above descriptions.

An embodiment of a third aspect of the present application provides an electric device, including the above-mentioned battery, the battery being configured to supply electric energy to the electric device.

Certainly, any product or method for implementing the present application does not necessarily achieve all the advantages described above at the same time. The foregoing description merely briefly describes the technical solution of the present application. To more clearly understand the technical means of the present application, the technical means of the present application can be implemented according to content of the specification. Moreover, to make the foregoing and other objectives, characteristics, and advantages of the present application more comprehensible, particular embodiments of the present application are described below.

BRIEF DESCRIPTION OF DRAWINGS

Various other advantages and merits will become apparent to those skilled in the art by reading through the following detailed description of some embodiments. Figures are only intended to illustrate some embodiments and not construed as limiting the present application. In all figures, like reference numerals denote like parts. In the drawings.

Figure 1:
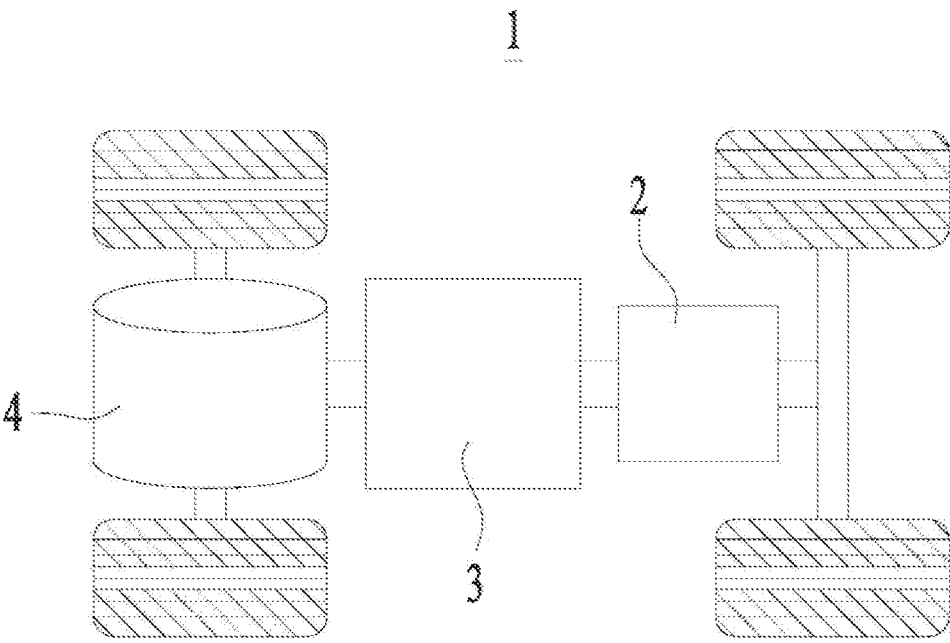
FIG. 1 is a schematic structural diagram of a vehicle according to some embodiments of the present application.

Reference numerals: 1—vehicle, 2—battery, 3—controller, 4—motor, 5—battery box, 6—battery cell, 7—high voltage box, 51—first part, 52—second part, 72—relay, 73—water cooling plate, 74—heat conduction metal block, 75—heat conduction pad, 76—heat—conduction insulating film, 711—upper housing, 712—lower housing, 713—electric connection region, 714—locking point, 715—chamfered structure, 721—conducting strip, 7121—metal portion, and 7122—plastic portion.

DETAILED DESCRIPTION OF EMBODIMENTS

The embodiments of the technical solutions of the present application will be described in detail below with reference to the accompanying drawings. The following embodiments are only used to illustrate the technical solutions of the present application more clearly, and are therefore only used as examples, and cannot be used to limit the protection scope of the present application.

Unless defined otherwise, all technical and scientific terms used herein have the same meanings as are commonly understood by those skilled in the art; the terms used herein are merely for the purpose of describing particular embodiments, and are not intended to limit the present application; the terms "including" and "having" and any of their variations in the specification, claims and aforesaid figures of the present application are intended to cover non-exclusive inclusion.

In the description of the embodiments of the present application, the technical terms such as "first", "second", or the like, are only used for distinguishing different objects, and are not intended to indicate or imply relative importance or significance or to imply the number, specific sequence or primary and secondary relationship of indicated technical features. In the description of the embodiments of the present application, "a plurality of" means two or more than two unless otherwise specified.

The term "embodiment" mentioned herein is intended to mean that specific features, structures, or characteristics described in conjunction with the embodiments may be included in at least one embodiment of the present application. This term "embodiment" appearing at various places throughout the specification does not necessarily refer to the same embodiments, or independent or alternative embodiments that are mutually conflicting with other embodiments. Persons skilled in the art can explicitly and implicitly understand that the embodiments described herein may be combined with other embodiments.

In the description of the embodiments of the present application, the term "and/or" herein only describes an association relationship between associated objects, and indicates that three relationships may exist. For example, A and/or B may indicate three cases: only A exists; both A and B exist; and only B exists. In addition, in this specification, the symbol "/" generally indicates that associated objects have a relationship of "or".

In the description of the embodiments of the present application, the term "a plurality of" means more than two (including two); similarly, "a plurality of groups" means more than two groups (including two groups), and "a plurality of sheets" means more than two sheets (including two sheets).

In the description of the embodiments of the present application, directions or positional relationships indicated by the technical terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential" etc. are based on orientations or positional relationships shown in the accompanying drawings, and they are used only for describing the embodiments of the present application and for description simplicity, but do not indicate or imply that an indicated device or element must have a specific orientation or be constructed and operated in a specific orientation. Therefore, it cannot be understood as a limitation on the embodiments of the present application.

In the description of the embodiments of the present application, unless specified or limited otherwise, the technical terms "mounted", "connected", "coupled", and "fixed" and the like are used broadly, and may be, for example, fixed connection, detachable connection, or integral connection; may also be mechanical or electrical connection; may also be direct connection or indirect connection via intervening structures; may also be communication or an interaction relationship of two elements. Specific meanings of the above terms in the embodiments of the present application can be understood by those skilled in the art according to specific situations.

A high voltage box includes components and parts, such as a fuse, a relay, a current sensor, a pre-charging resistor, or the like, and all the components and parts are provided in an accommodating space in the high voltage box. In order to guarantee normal operation of an electric device, such as an electric vehicle, or the like, the high voltage box is required to work in a vibration environment, a high and low temperature environment, a damp and hot environment, an environment with high power output, or the like. Furthermore, in order to reduce a space of the whole vehicle and connecting wiring harnesses to the maximum extent, and reduce a probability of thermal failure and other phenomena of the high voltage box or a battery, requirements exist for an arrangement scheme of the components and parts in the high voltage box, and the high voltage box is required to be equipped with a good heat dissipation system.

In a related art, a heat dissipation performance of the high voltage box may be improved by increasing a cross-sectional area of a bus bar in the high voltage box. However, the increase of the cross-sectional area of the bus bar requires a greater space inside the high voltage box. In order to solve the above-mentioned problem, a housing of the high voltage box may be provided with heat dissipation holes, so as to improve the heat dissipation performance of the high voltage box while the space in the high voltage box is not influenced. However, the heat dissipation hole has a small improving effect on the heat dissipation performance of the high voltage box, and may also influence a safety performance of the battery with the high voltage box.

Based on the above considerations, in order to improve a heat dissipation effect of the high voltage box and the safety performance of the battery, the inventor has designed a high voltage box after in-depth research, i.e., the high voltage box according to the present application. By inverting a relay in the high voltage box, a conducting strip on the relay is in contact with a lower housing of the high voltage box, such that heat generated in a working process of the relay may be directly transferred to the lower housing of the high voltage box through the conducting strip, thereby improving a heat dissipation capability of the high voltage box, and improving the safety performance of the battery.

An embodiment of the present application provides an electric device with the battery including the above-mentioned high voltage box as a power source, and the electric device may be, but is not limited to, a mobile phone, a portable apparatus, a notebook computer, a battery car, an electric vehicle, a ship, a spacecraft, an electric toy, an electric tool, or the like; for example, the spacecraft includes an airplane, a rocket, a space shuttle, a spaceship, or the like; the electric toy includes a stationary or movable electric toy, for example, a game machine, an electric car toy, an electric ship toy, an electric airplane toy, or the like; the electric tool includes a metal cutting electric tool, a grinding electric tool, an assembly electric tool, and an electric tool for railways, for example, an electric drill, an electric grinder, an electric wrench, an electric screwdriver, an electric hammer, an electric impact drill, a concrete vibrator, and an electric planer.

The battery described in the embodiment of the present application is not limited to application to the above-described electric device, but may be applied to all devices in which batteries are used, and for simplicity of description, the following embodiments are all described with an electric vehicle as an example.

For example, referring to FIG. 1 which is a schematic structural diagram of a vehicle 1 according to an embodiment of the present application, the vehicle 1 may be a fuel vehicle, a gas vehicle, or a new energy vehicle, and the new energy vehicle may be a battery electric vehicle, a hybrid electric vehicle, an extended range vehicle, or the like. The vehicle 1 may be provided therein with a battery 2, a controller 3, and a motor 4, and the controller 3 is configured to control the battery 2 to supply power to the motor 4. For example, the battery 2 may be provided at a bottom or front or rear of the vehicle 1. The battery 2 may be configured to supply power to the vehicle 1; for example, the battery 2 may be used as an operation power source of the vehicle 1 for a circuit system of the vehicle 1, for example, for work power demand in starting, navigation, and running of the vehicle 1. In another embodiment of the present application, the battery 2 may be used not only as the operation power source of the vehicle 1 but also as a driving power source of the vehicle 1, and replaces or partially replaces fuel oil or natural gas to provide driving power for the vehicle 1.

Figure 2:
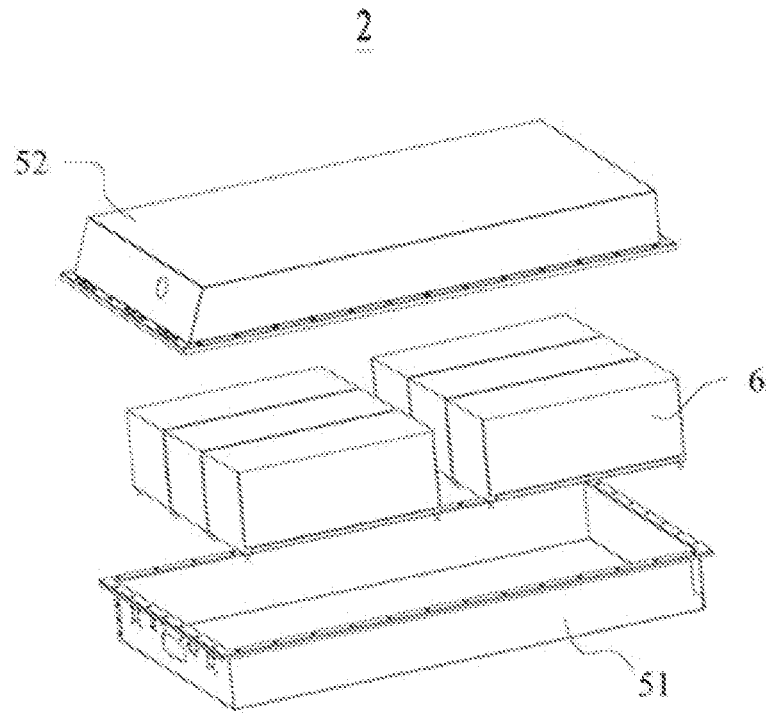
FIG. 2 is a schematic exploded structural diagram of a battery according to some embodiments of the present application.

The battery 2 according to the embodiment of the present application refers to a single physical module including one or more battery cells 6 to provide a higher voltage and capacity. Referring to FIG. 2, the battery 2 may include a plurality of battery cells 6. A number of the battery cells 6 and a connection condition between the battery cells 6 may be set according to requirements to meet different power requirements. Specifically, the plurality of battery cells 6 may be connected in series or in parallel or in series and parallel, and the series and parallel connection refers to a mixture of series connection and parallel connection, such that the battery 2 has larger capacity or power. Optionally, the plurality of battery cells 6 may be connected in series or in parallel or in series and parallel to form battery modules, and the plurality of battery modules may be connected in series or in parallel or in series and parallel to form the battery 2. That is, the plurality of battery cells 6 may directly constitute the battery 2, or may first constitute the battery modules, and then, the battery modules constitute the battery 2.

The battery 2 further includes a battery box 5 (or called a cover), the battery box 5 has an accommodating space therein, and the plurality of battery cells 6 are accommodated in the accommodating space. As shown in FIG. 2, the battery box 5 may include two parts which are referred to herein as a first part 51 and a second part 52 respectively, and reference is made to FIG. 2 and FIG. 3 which shows the first part 51 of the battery box 5. The first part 51 and the second part 52 may be connected by buckling, bonding, or the like, to form the accommodating space. The plurality of battery cells 6 are connected in parallel or in series or in series and parallel to be placed in the box 5 formed by connecting the first part 51 and the second part 52. Shapes of the first part 51 and the second part 52 may be determined according to a shape combined by the plurality of battery cells 6.

The battery box 5 is configured to protect the at least one battery cell 6, so as to reduce an influence of liquid or other foreign matter outside the battery 2 on charging or discharging of the at least one battery cell 6. The battery cell 6 may have a shape of a cylinder, a flat body, a rectangular parallelepiped, or other shapes, which is not limited in the embodiment of the present application. A packaging manner of the battery cell 6 includes, but is not limited to, a cylindrical battery cell, a square battery cell, a pouch battery cell, or the like, which is not specifically limited in the embodiment of the present application.

Furthermore, the battery 2 may include other structures which are not repeated herein. For example, the battery 2 may further include a bus component. The bus component is configured to electrically connect the plurality of battery cells 6, for example, to connect the plurality of battery cells 6 in parallel or in series or in series and parallel. Specifically, the bus component may achieve electric connection between the battery cells 6 by connecting electrode terminals of the battery cells 6. Further, the bus component may be fixedly connected with the electrode terminals of the battery cells 6 by welding. Optionally, the bus component may include a conductive mechanism, and electric energy generated by the plurality of battery cells 6 may be further guided out through the battery box 5 by the conductive mechanism.

Figure 3:
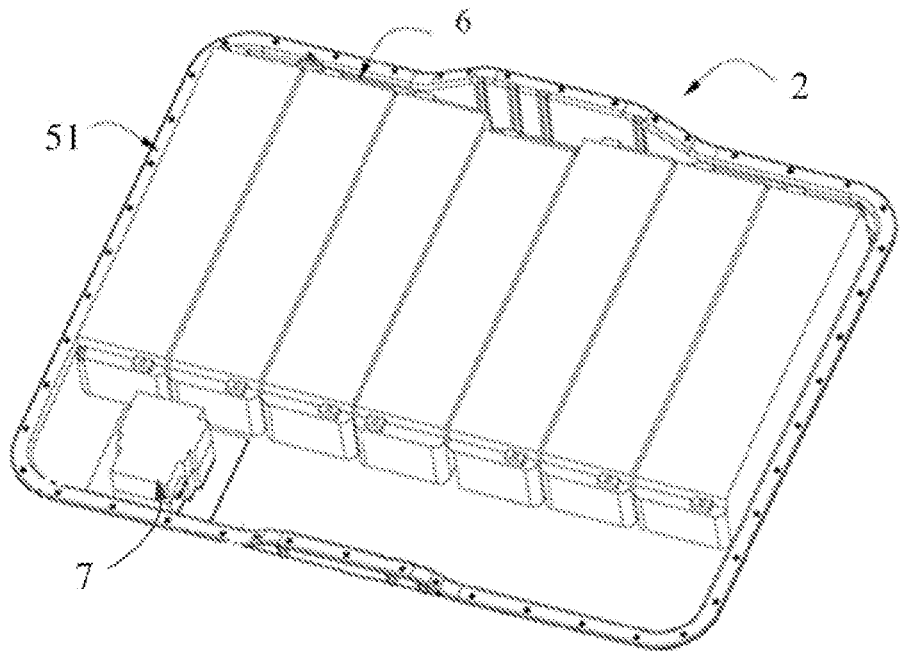
FIG. 3 is a schematic internal structural diagram of a battery according to some embodiments of the present application.
Figure 4:
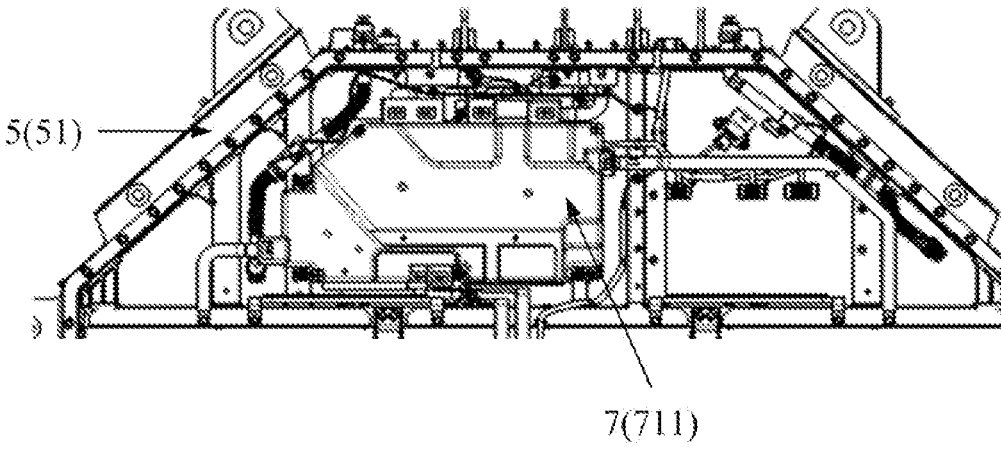
FIG. 4 is a partial top view of a battery box according to some embodiments of the present application.
Figure 5:
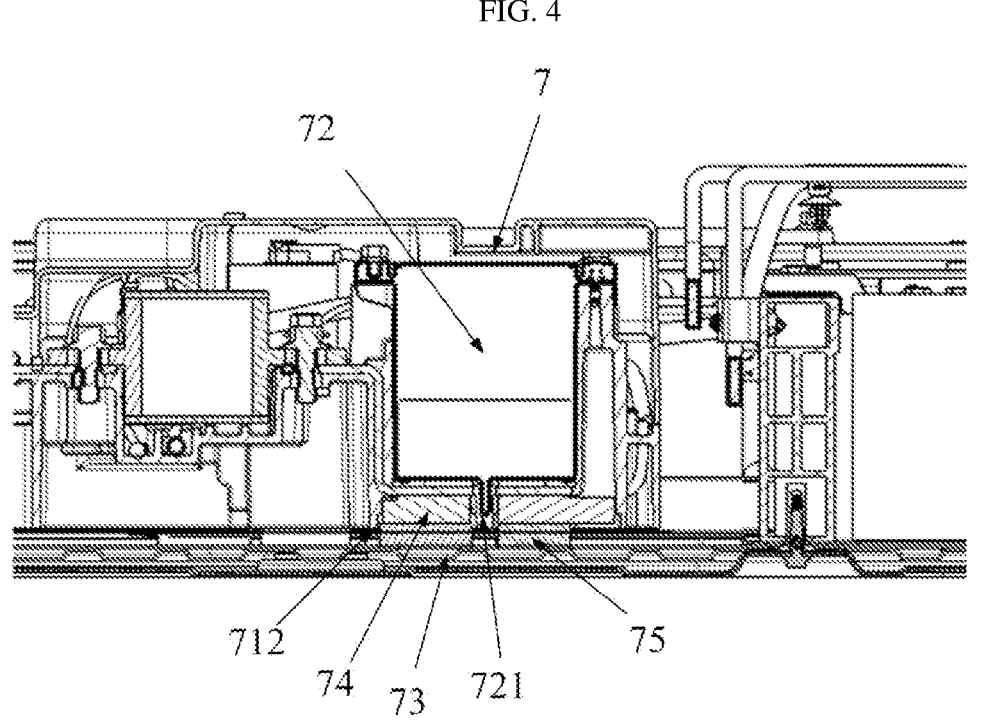
FIG. 5 is a sectional view of a high voltage box according to some embodiments of the present application.

According to some embodiments of the present application, referring to FIGS. 3 to 5, an embodiment of a first aspect of the present application provides a high voltage box 7. The high voltage box 7 includes a housing and a relay 72, the housing includes an upper housing 711 and a lower housing 712, and the upper housing 711 and the lower housing 712 are connected to form an accommodating space. The relay 72 is provided in the accommodating space, the relay 72 includes a conducting strip 721, and the conducting strip 721 is in contact with the lower housing 712.

In the embodiment of the present application, the upper housing 711 and the lower housing 712 are configured to form the accommodating space to accommodate components and parts in the high voltage box 7. The upper housing 711 and the lower housing 712 are configured to protect components and parts, such as the relay 72, or the like, so as to reduce an influence of external objects on the components and parts, such as the relay 72, or the like, in the high voltage box 7 and an influence of high voltage components and parts in the high voltage box 7 on other structures inside the battery 2. Furthermore, as shown in FIGS. 3 and 4, the lower housing 712 is further configured to be fixedly connected with the battery box 5 to fix the high voltage box 7 in the battery box 5. The upper housing 711 and the lower housing 712 may be made of plastic, metal, or the like, which is not limited in the present application.

The relay 72 is provided in the housing of the high voltage box 7, and the conducting strip 721 of the relay 72 is an element for leading out a circuit inside the relay 72 and being connected with the outside.

In the technical solution of the embodiment of the present application, as shown in FIGS. 4 and 5, the high voltage box 7 may be provided in the battery box 5, and the lower housing 712 of the high voltage box 7 is fixedly connected with the battery box 5. The relay 72 is provided in the high voltage box 7, and the conducting strip 721 of the relay 72 is in direct contact with an inner side of the lower housing 712 of the high voltage box 7. In a working process of the high voltage box 7, heat generated by work of the relay 72 is transferred to the conducting strip 721 of the relay 72, and since the conducting strip 721 is in direct contact with the inner side of the lower housing 712, the heat in the conducting strip 721 may be directly transferred into the lower housing 712 and is rapidly transferred to the outside of the high voltage box 7 via the lower housing 712, thus reducing a probability of transferring and storing the heat inside the high voltage box 7. The heat generated by the relay 72 is rapidly dissipated via the conducting strip 721 and the lower housing 712, such that a heat dissipation efficiency of the high voltage box 7 may be improved, thereby reducing a probability of an overheating phenomenon, or the like, of the high voltage box 7, and improving the safety performance of the battery 2.

According to some embodiments of the present application, referring to FIG. 5, the high voltage box 7 further includes a water cooling plate 73, the water cooling plate 73 is in contact with a side of the lower housing 712 away from the relay 72, the water cooling plate 73 includes at least one water cooling channel, and the water cooling plate 73 further includes a water inlet and a water outlet which are communicated with the at least one water cooling channel.

In the embodiment of the present application, as shown in FIG. 5, the water cooling plate 73 may come into contact and be connected with the lower housing 712 of the high voltage box 7. The water cooling plate 73 is an assembly which may absorb the heat in the lower housing 712 to cool the lower housing 712 and the high voltage box 7. The water cooling plate 73 includes at least one water cooling channel, cooling water flows into the at least one water cooling channel through the water inlet in the water cooling plate 73, so as to absorb the heat transferred to the water cooling plate 73 from the high voltage box 7, and then, the cooling water after heat absorption flows out through the water outlet, thus cooling the high voltage box 7. Further, the battery 2 may further include a battery water cooling plate configured to cool the battery module or battery cell 6, and the water cooling plate 73 in the embodiment of the present application and the battery water cooling plate may also have an integral structure, so as to reduce a space occupied by the high voltage box 7 and the water cooling plate 73 contained therein, and reduce structural complexity in the battery 2.

In the embodiment of the present application, after transferred to the lower housing 712, the heat generated by the components and parts, such as the relay 72, or the like, in the high voltage box 7 is transferred via the lower housing 712 to the water cooling plate 73 contacting and connected with the lower housing 712, and then absorbed by the cooling water flowing in the water cooling plate 73; that is, the water cooling plate 73 may absorb the heat transferred to the lower housing 712 from the components and parts, such as the relay 72, or the like, so as to cool the high voltage box 7, thereby further improving the heat dissipation effect of the high voltage box 7 and the safety performance of the battery 2.

Figure 7:
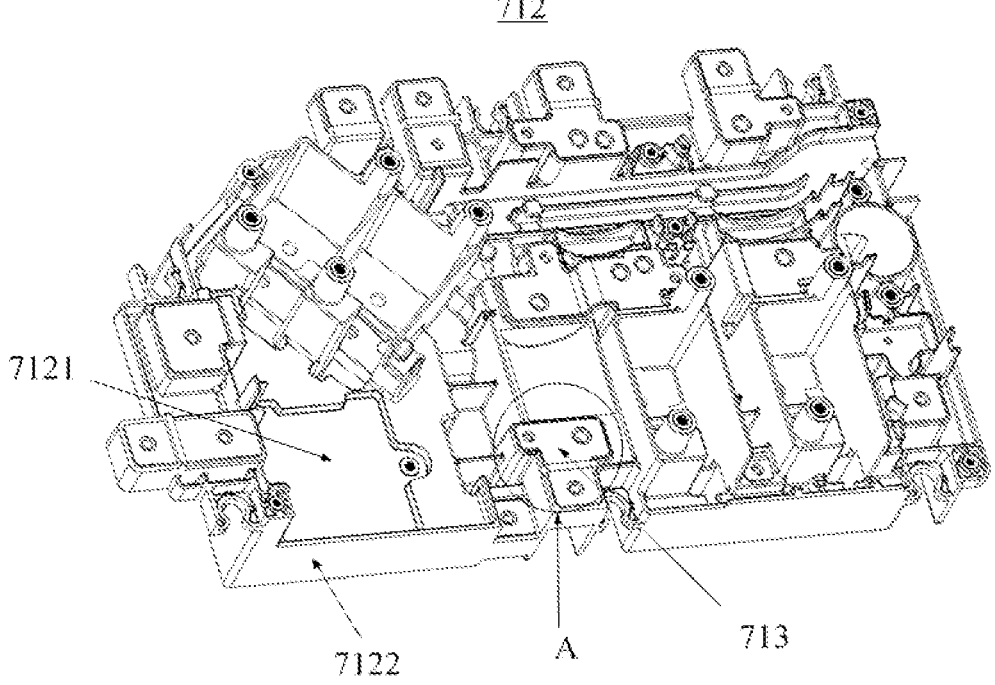
FIG. 7 is a schematic structural diagram of a lower housing of a high voltage box according to some embodiments of the present application.

According to some embodiments of the present application, referring to FIG. 7, the lower housing 712 includes a metal portion 7121 and a plastic portion 7122 which are integrally molded by injection.

In the embodiment of the present application, the metal portion 7121 and the plastic portion 7122 are both main components of the lower housing 712. The metal portion 7121 may be made of metal or alloy having a large heat conductivity coefficient and good thermal conductivity, such as copper, aluminum, or the like. The plastic portion 7122 may be made of an insulating material, such as rubber, plastic, or the like.

In the embodiment of the present application, the lower housing 712 has the metal portion 7121 therein, and since the metal portion 7121 has a large heat conductivity coefficient and good thermal conductivity, the heat generated in the high voltage box 7 may be quickly guided out via the metal portion 7121 and absorbed by the water cooling plate 73 being in contact with the metal portion 7121, which increases a heat transfer speed, thus further improving the heat dissipation effect of the high voltage box 7. The integral injection molded structure may not only save a space arrangement of the high voltage box 7, but also improve an assembly efficiency of the high voltage box 7.

According to some embodiments of the present application, referring to FIG. 7, a side of the metal portion 7121 away from the relay 72 is exposed on a surface of the lower housing 712 and is in contact with the water cooling plate 73.

In the embodiment of the present application, the surface of the metal portion 7121 is exposed and directly contacts the water cooling plate 73; that is, the plastic portion 7122 is not provided between the metal portion 7121 and the water cooling plate 73, such that the heat generated in the high voltage box 7 may be quickly guided out via the metal portion 7121 and absorbed by the water cooling plate 73 contacting the metal portion 7121, and the heat conducted on the lower housing 712 of the high voltage box may be better transferred to the water cooling plate 73, thereby increasing the heat transfer speed and further improving the heat dissipation effect of the high voltage box 7.

According to some embodiments of the present application, referring to FIG. 5, the high voltage box 7 further includes at least one heat conduction metal block 74, the at least one heat conduction metal block 74 is provided in the accommodating space, and the at least one heat conduction metal block 74 is connected with the conducting strip 721 and is in contact with the lower housing 712.

In the embodiment of the present application, the at least one heat conduction metal block 74 includes, but is not limited to, a metal block with a large heat conductivity coefficient and high thermal conductivity, such as an aluminum block, a copper block, or the like. The at least one heat conduction metal block 74 is configured to conduct and store heat energy. A shape of the at least one heat conduction metal block 74 includes, but is not limited to, a rectangle, or the like. The at least one heat conduction metal block 74 may be in locked connection with the conducting strip 721 of the relay 72.

In the embodiment of the present application, the at least one heat conduction metal block 74 is provided in the high voltage box 7, the at least one heat conduction metal block 74 is connected with the conducting strip 721, and the at least one heat conduction metal block 74 may store part of the heat energy emitted by the relay 72, thus further increasing a heat dissipation speed of the relay 72. Furthermore, since the at least one heat conduction metal block 74 contacts both the conducting strip 721 of the relay 72 and the lower housing 712, the heat generated by the relay 72 may be transferred into the lower housing 712 via the at least one heat conduction metal block 74, such that the at least one heat conduction metal block 74 and the lower housing 712 of the high voltage box have a larger contact area, a heat dissipation area of the relay 72 is increased, a new path is provided for transfer of the heat of the relay 72 to the lower housing 712 of the high voltage box, and the heat energy stored in the at least one heat conduction metal block 74 and the heat energy transferred by the relay 72 may be better transferred to the lower housing 712, thus improving the heat dissipation efficiency of the high voltage box 7.

Figure 6:
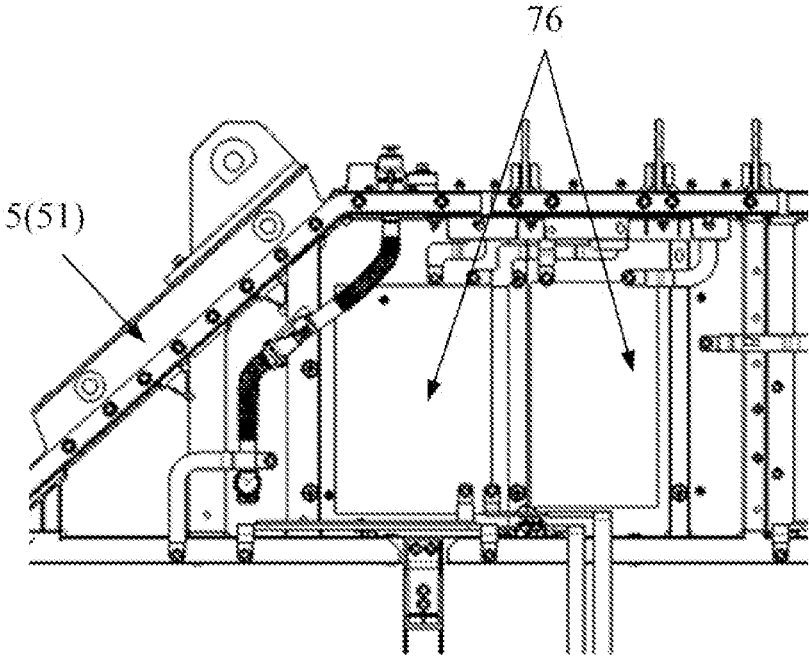
FIG. 6 is a partial top view of a battery box according to some embodiments of the present application.

According to some embodiments of the present application, referring to FIGS. 5 and 6, the high voltage box 7 further includes a heat conduction pad 75 and a heat-conduction insulating film 76, the heat conduction pad 75 is provided between the lower housing 712 and the water cooling plate 73, and the heat-conduction insulating film 76 is provided between the heat conduction pad 75 and the water cooling plate 73.

In the embodiment of the present application, the heat conduction pad 75 is made of a high-performance gap-filling heat conduction material, and may be configured to form a heat transfer interface between the lower housing 712 and the water cooling plate 73, and fill a gap between the lower housing 712 of the high voltage box and the water cooling plate 73, so as to complete heat transfer between the lower housing 712 of the high voltage box and the water cooling plate 73. The heat-conduction insulating film 76 is an insulating component covering a surface of the water cooling plate 73 to transfer the heat to the water cooling plate 73 more quickly. The heat conduction pad 75 and the heat-conduction insulating film 76 may be made of a same material having both good thermal conductivity and an excellent insulating property, such as a silicone material which has both good thermal conductivity and an excellent insulating property and may meet most requirements for heat conduction and insulation. The materials of the heat conduction pad 75 and the heat-conduction insulating film 76 may be selected according to requirements, which is not limited in the embodiment of the present application.

In the embodiment of the present application, the heat conduction pad 75 may fill the gap between the lower housing 712 and the water cooling plate 73, so as to exhaust air between the lower housing 712 and the water cooling plate 73, such that the water cooling plate 73 more sufficiently contacts the lower housing 712, thereby improving the heat dissipation effect of the high voltage box 7. The heat conduction pad 75 is provided between the lower housing 712 and the water cooling plate 73, and may thus rapidly absorb the heat in the high voltage box 7 and rapidly transfer the heat to the water cooling plate 73, thus further improving the heat dissipation efficiency of the high voltage box 7. The heat-conduction insulating film 76 may reduce a probability that a current in the high voltage box 7 is transmitted to the water cooling plate 73 while guaranteeing the heat dissipation efficiency, thus improving safety of the high voltage box 7.

Figure 8:
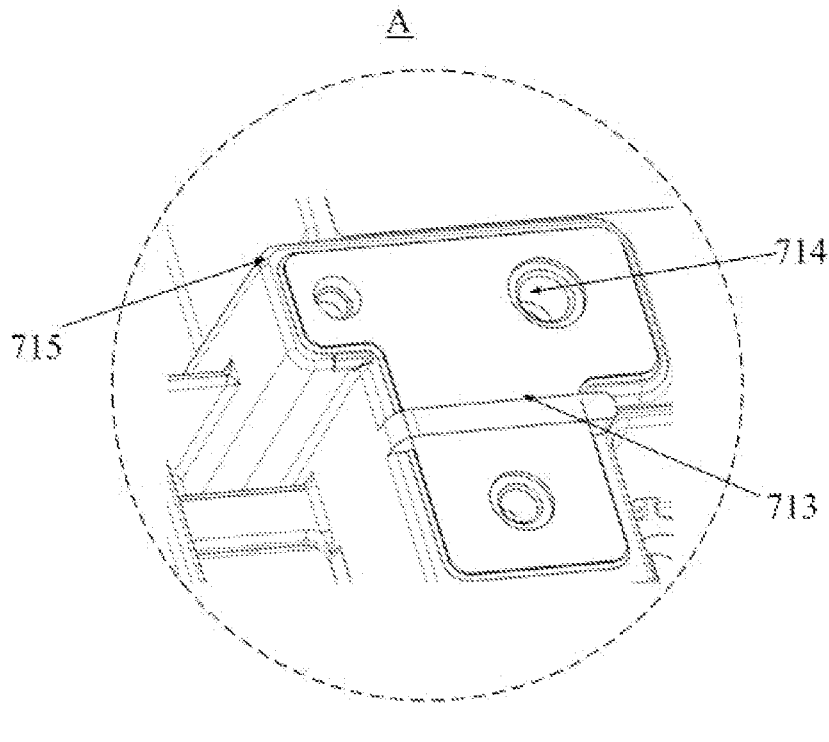
FIG. 8 is an enlarged view of region A in FIG. 7.

According to some embodiments of the present application, referring to FIGS. 7 and 8, a side of the metal portion 7121 close to the relay 72 includes at least one electric connection region 713, and the at least one electric connection region 713 is exposed on the surface of the lower housing 712.

In the embodiment of the present application, the electric connection region 713 is an electric connection plane of the lower housing 712, the electric connection region 713 may include a plurality of locking points 714 thereon, the locking points 714 are configured to fix the high voltage box 7 and other components and parts, and the locking points 714 are also exposed on the surface of the lower housing 712.

In the embodiment of the present application, the electric connection region 713 is exposed on the surface of the lower housing 712; that is, no plastic part exists on and shields the electric connection region 713, which facilitates connection between the lower housing 712 and the components and parts in the high voltage box 7, thus improving an efficiency of assembly between the lower housing 712 and the components and parts in the high voltage box.

According to some embodiments of the present application, referring to FIGS. 7 and 8, the electric connection region 713 is of a convex structure.

In the embodiment of the present application, as shown in FIGS. 6 and 8, the electric connection region 713 may be an electric connection plane formed after the metal portion 7121 is stamped or subjected to other processes to protrude towards the inside of the high voltage box 7. The electric connection region 713 is set to be of a convex structure, thus reducing requirements for flatness of a surface of the electric connection region 713, and after the electric connection region 713 contacts the components and parts in the high voltage box 7, reducing gaps between the electric connection region 713 and contact surfaces of the components and parts, and reducing a useless overlapping area in the high voltage box 7. The convex structure facilitates the connection between the electric connection region 713 and the components and parts in the high voltage box 7, thereby further improving the efficiency of assembly between the lower housing 712 and the components and parts of the high voltage box.

According to some embodiments of the present application, referring to FIG. 8, a chamfered structure 715 is provided at an edge of at least one side of the electric connection region 713, and the chamfered structure 715 is provided with an insulating layer.

In the embodiment of the present application, the chamfered structure 715 is provided at the edge of the electric connection region 713, and in a pressing process of integral injection molding of the metal portion 7121 and the plastic portion 7122 of the lower housing 712, the chamfered structure 715 may reduce a probability of residual glue on the surface of the electric connection region 713, thereby reducing a probability that the connection of the lower housing 712 and the components and parts is influenced by the residual glue on the surface of the electric connection region 713. A size of the chamfered structure 715 may be set according to actual requirements and process precision, which is not limited in the present application. For example, the chamfered structure 715 may have a size of C0.6. The inventor of the present application has actually verified that the chamfered structure 715 of C0.6 may meet requirements of a production process, and may also achieve a use effect required by the embodiment of the present application.

Furthermore, the chamfered structure 715 may reduce requirements for manufacturing precision of the lower housing 712 and a manufacturing mold of the lower housing 712, thus simplifying production process flow of the lower housing 712. The insulating layer is provided on the chamfered structure 715 and may be covering rubber, thus reducing an influence of the manufacturing mold of the lower housing 712 on the surface of the electric connection region 713 in the pressing process, and also reducing a probability of mold damage in the pressing process. Further, as shown in FIG. 8, the chamfered structure 715 may be provided around an edge of the electric connection region 713.

An embodiment of a second aspect of the present application provides a battery 2, including the high voltage box 7 according to any one of the above descriptions.

In the high voltage box 7 of the battery 2 in the technical solution of the embodiment of the present application, the high voltage box 7 may be provided in a battery box 5, and the lower housing 712 of the high voltage box 7 is fixedly connected with the battery box 5. The relay 72 is provided in the high voltage box 7, and the conducting strip 721 of the relay 72 is in direct contact with an inner side of the lower housing 712 of the high voltage box 7. In a working process of the high voltage box 7, heat generated by work of the relay 72 is transferred to the conducting strip 721 of the relay 72, and since the conducting strip 721 is in direct contact with the inner side of the lower housing 712, the heat in the conducting strip 721 may be directly transferred into the lower housing 712 and is rapidly transferred to the outside of the high voltage box 7 via the lower housing 712, thus reducing a probability of transferring and storing the heat inside the high voltage box 7. The heat generated by the relay 72 is rapidly dissipated via the conducting strip 721 and the lower housing 712, such that a heat dissipation efficiency of the high voltage box 7 may be improved, thereby reducing a probability of an overheating phenomenon, or the like, of the high voltage box 7, and improving the safety performance of the battery 2.

An embodiment of a third aspect of the present application provides an electric device, including the above-mentioned battery 2, the battery 2 being configured to supply electric energy to the electric device.

In the electric device in the technical solution of the embodiment of the present application, since the electric device includes the above-mentioned battery 2, the electric device has all advantages of the above-mentioned battery 2. The electric device may be any of the above-mentioned apparatuses or systems in which the battery 2 is applied.

Finally, it should be noted that the above embodiments are only used to illustrate the technical solutions of the present application, not to limit the present application; although the present application is described in detail with reference to the above embodiments, those having ordinary skill in the art should understand that they still can modify technical solutions recited in the aforesaid embodiments or equivalently replace partial or all technical features therein; these modifications or substitutions do not make essence of corresponding technical solutions depart from the scope of technical solutions of embodiments of the present application, and all of them should be included in the scope of the claims and description of the present application. Particularly, as long as structural conflicts do not exist, all technical features mentioned in all the embodiments may be combined together in any mode. The present application is not limited to the specific embodiments disclosed in the description, but includes all technical solutions falling in the scope of the claims.

What is claimed is:

1. A high voltage box, comprising:

a housing, comprising an upper housing and a lower housing, the upper housing and the lower housing being connected to each other to form an accommodating space;

a relay, provided in the accommodating space, the relay comprising a conducting strip leading out a circuit inside the relay and connected with outside, and the conducting strip being in contact with the lower housing; and at least one heat conduction metal block, wherein the at least one heat conduction metal block is provided in the accommodating space, and the at least one heat conduction metal block is connected to and in contact with both the conducting strip and the lower housing.

2. The high voltage box according to claim 1, further comprising:

a water cooling plate, wherein the water cooling plate is in contact with one side of the lower housing away from the relay, and the water cooling plate comprises:

at least one water cooling channel; and a water inlet and a water outlet which are communicated with the at least one water cooling channel.

3. The high voltage box according to claim 2, further comprising:

a heat conduction pad and a heat-conduction insulating film, wherein the heat conduction pad is provided between the lower housing and the water cooling plate, and the heat-conduction insulating film is provided between the heat conduction pad and the water cooling plate.

4. The high voltage box according to claim 2, wherein the lower housing comprises a metal portion and a plastic portion which are integrally molded by injection.

5. The high voltage box according to claim 4, wherein one side of the metal portion away from the relay is exposed on a surface of the lower housing and is in contact with the water cooling plate.

6. The high voltage box according to claim 4, wherein one side of the metal portion close to the relay comprises an electric connection region, and the one electric connection region is exposed on a surface of the lower housing.

7. The high voltage box according to claim 6, wherein the electric connection region is of a convex structure.

8. The high voltage box according to claim 6, wherein a chamfered structure is provided at an edge of at least one side of the electric connection region, and the chamfered structure is provided with an insulating layer.

9. A battery, comprising a high voltage box comprising:

a housing, comprising an upper housing and a lower housing, the upper housing and the lower housing being connected to each other to form an accommodating space;

a relay, provided in the accommodating space, the relay comprising a conducting strip leading out a circuit inside the relay and connected with outside, and the conducting strip being in contact with the lower housing; and at least one heat conduction metal block, wherein the at least one heat conduction metal block is provided in the accommodating space, and the at least one heat conduction metal block is connected to and in contact with both the conducting strip and the lower housing.

10. The battery according to claim 9, wherein the high voltage box further comprises:

a water cooling plate, wherein the water cooling plate is in contact with one side of the lower housing away from the relay, and the water cooling plate comprises:

at least one water cooling channel; and a water inlet and a water outlet which are communicated with the at least one water cooling channel.

11. The battery according to claim 10, wherein the high voltage box further comprises:

a heat conduction pad and a heat-conduction insulating film, wherein the heat conduction pad is provided between the lower housing and the water cooling plate, and the heat-conduction insulating film is provided between the heat conduction pad and the water cooling plate.

12. The battery according to claim 10, wherein the lower housing comprises a metal portion and a plastic portion which are integrally molded by injection.

13. The battery according to claim 12, wherein one side of the metal portion away from the relay is exposed on a surface of the lower housing and is in contact with the water cooling plate.

14. The battery according to claim 12, wherein one side of the metal portion close to the relay comprises an electric connection region, and the one electric connection region is exposed on a surface of the lower housing.

15. The battery according to claim 14, wherein the electric connection region is of a convex structure.

16. The battery according to claim 14, wherein a chamfered structure is provided at an edge of at least one side of the electric connection region, and the chamfered structure is provided with an insulating layer.

17. An electric device, comprising a battery configured to supply electric energy to the electric device, the battery comprising a high voltage box that comprises:

a housing, comprising an upper housing and a lower housing, the upper housing and the lower housing being connected to each other to form an accommodating space;

a relay, provided in the accommodating space, the relay comprising a conducting strip leading out a circuit inside the relay and connected with outside, and the conducting strip being in contact with the lower housing; and at least one heat conduction metal block, wherein the at least one heat conduction metal block is provided in the accommodating space, and the at least one heat conduction metal block is connected to and in contact with both the conducting strip and the lower housing.

18. The electric device according to claim 17, wherein the high voltage box further comprises:

a water cooling plate, wherein the water cooling plate is in contact with one side of the lower housing away from the relay, and the water cooling plate comprises:

at least one water cooling channel; and a water inlet and a water outlet which are communicated with the at least one water cooling channel.

* * * * *